(12) United States Patent
Arima

(10) Patent No.: US 11,403,952 B2
(45) Date of Patent: Aug. 2, 2022

(54) METHOD AND SYSTEM FOR PROVIDING AN EQUIPPED AUTONOMOUS VEHICLE TO A DESTINATION

(71) Applicant: Honda Motor Co., Ltd., Tokyo (JP)

(72) Inventor: Takero Arima, Torrance, CA (US)

(73) Assignee: Honda Motor Co., Ltd., Tokyo (JP)

(*) Notice: Subject to any disclaimer, the term of this patent is extended or adjusted under 35 U.S.C. 154(b) by 512 days.

(21) Appl. No.: 16/395,617

(22) Filed: Apr. 26, 2019

(65) Prior Publication Data
US 2020/0342763 A1   Oct. 29, 2020

(51) Int. Cl.
*G06Q 10/02* (2012.01)
*G05D 1/00* (2006.01)
*G06Q 50/30* (2012.01)
*G08G 1/00* (2006.01)

(52) U.S. Cl.
CPC .......... *G08G 1/202* (2013.01); *G05D 1/0088* (2013.01); *G06Q 10/02* (2013.01); *G06Q 50/30* (2013.01); *G05D 2201/0213* (2013.01)

(58) Field of Classification Search
CPC ........ G08G 1/202; G06Q 10/02; G06Q 50/30; G05D 1/0088; G05D 2201/0213
See application file for complete search history.

(56) References Cited

U.S. PATENT DOCUMENTS

| | | | |
|---|---|---|---|
| 7,818,190 B1 | 10/2010 | Sutherland | |
| 8,199,890 B2 | 6/2012 | Pirzada | |
| 8,948,914 B2 * | 2/2015 | Zini | G05B 19/41895 700/258 |
| 9,665,101 B1 | 5/2017 | Templeton | |
| 9,733,096 B2 | 8/2017 | Colijn et al. | |
| 10,013,821 B1 | 7/2018 | Dudar | |
| 10,625,685 B1 | 4/2020 | Gruener | |
| 2008/0027599 A1 | 1/2008 | Logan et al. | |
| 2011/0242533 A1 | 10/2011 | Treado et al. | |
| 2013/0342368 A1 | 12/2013 | Nathanson | |
| 2016/0033966 A1 * | 2/2016 | Farris | A47G 29/141 701/15 |
| 2017/0228025 A1 | 8/2017 | Hall | |
| 2019/0018418 A1 | 1/2019 | Tseng et al. | |
| 2019/0105995 A1 | 4/2019 | Prasad et al. | |

FOREIGN PATENT DOCUMENTS

| | | |
|---|---|---|
| EP | 3246776 B1 | 11/2020 |
| IN | 201641044061 A | 6/2018 |
| KR | 101074328 B1 | 10/2011 |

(Continued)

*Primary Examiner* — Geepy Pe
*Assistant Examiner* — Paulo Roberto Gonzalez Leite
(74) *Attorney, Agent, or Firm* — Plumsea Law Group, LLC (57) ABSTRACT

A method and system provides an equipped autonomous vehicle to a destination. In one embodiment, a method for providing an equipped autonomous vehicle to a destination includes receiving a request from a user for an equipped autonomous vehicle. The request includes at least one selected activity and a destination. The method includes determining, from the request, a set of equipment for the at least one selected activity and providing the equipped autonomous vehicle with the set of equipment for the at least one selected activity. The method also includes instructing the equipped autonomous vehicle to travel to the destination requested by the user.

20 Claims, 8 Drawing Sheets

(56) References Cited

FOREIGN PATENT DOCUMENTS

| | | |
|---|---|---|
| KR | 101583061 B1 | 1/2016 |
| KR | 20160029761 A | 3/2016 |
| KR | 101933493 B1 | 12/2018 |
| KR | 101918744 B1 | 2/2019 |
| WO | 2019240664 A1 | 12/2019 |

* cited by examiner

METHOD AND SYSTEM FOR PROVIDING AN EQUIPPED AUTONOMOUS VEHICLE TO A DESTINATION

BACKGROUND

The embodiments relate generally to autonomous vehicles, and in particular to a method and system for providing an equipped autonomous vehicle to a destination.

Many types of outdoor activities can include specialized equipment. This equipment can be used a few times a year and is usually kept in storage. Participants of outdoor activities can plan for storing, maintaining, and transporting this specialized equipment to a desired destination where it is to be used. Participants who enjoy a variety of outdoor activities can store, maintain, and/or transport large quantities of different specialized equipment for each outdoor activity. Additionally, participants can take care of returning and cleaning the equipment from a destination after a trip has ended.

SUMMARY

The techniques of the present embodiments described herein provide a method and system for providing an equipped autonomous vehicle to a destination.

In one aspect, a method for providing an equipped autonomous vehicle to a destination is provided. The method can include: receiving a request from a user for an equipped autonomous vehicle, wherein the request includes at least one selected activity and a destination; determining, from the request, a set of equipment for the at least one selected activity; providing the equipped autonomous vehicle with the set of equipment for the at least one selected activity; and instructing the equipped autonomous vehicle to travel to the destination requested by the user.

In another aspect, a system for providing an equipped autonomous vehicle to a destination is provided. The system can include; a service provider; and at least one autonomous vehicle; wherein the service provider is configured to; receive a request from a user for an equipped autonomous vehicle, wherein the request includes at least one selected activity and a destination; determine, from the request, a set of equipment for the at least one selected activity; provide the at least one autonomous vehicle with the set of equipment for the at least one selected activity; and instruct the at least one autonomous vehicle that includes the set of equipment to travel to the destination requested by the user.

Other systems, methods, features and advantages of the exemplary embodiments will be, or will become, apparent to one of ordinary skill in the art upon examination of the following figures and detailed description. It is intended that all such additional systems, methods, features and advantages be included within this description and this summary, be within the scope and protected by the claims.

BRIEF DESCRIPTION OF THE DRAWINGS

The exemplary embodiments can be better understood with reference to the following drawings and description. The components in the figures are not necessarily to scale. Moreover, in the figures, like reference numerals designate corresponding parts throughout the different views.

DETAILED DESCRIPTION

The example embodiments described herein provide a method and system for providing an equipped autonomous vehicle to a destination based on a request from a user. The techniques described herein allow users to enjoy a variety of outdoor activities without needing to worry about purchasing, storing, maintaining, and/or transporting specialized equipment for the outdoor activities to the user's desired destination where the equipment is to be used. A user merely needs to travel to the destination where the equipped autonomous vehicle will meet the user with the appropriate equipment for the selected outdoor activities. Once the user is finished, the equipment is placed back into the equipped autonomous vehicle, which returns to a service center to be readied for the next user.

Figure 1:
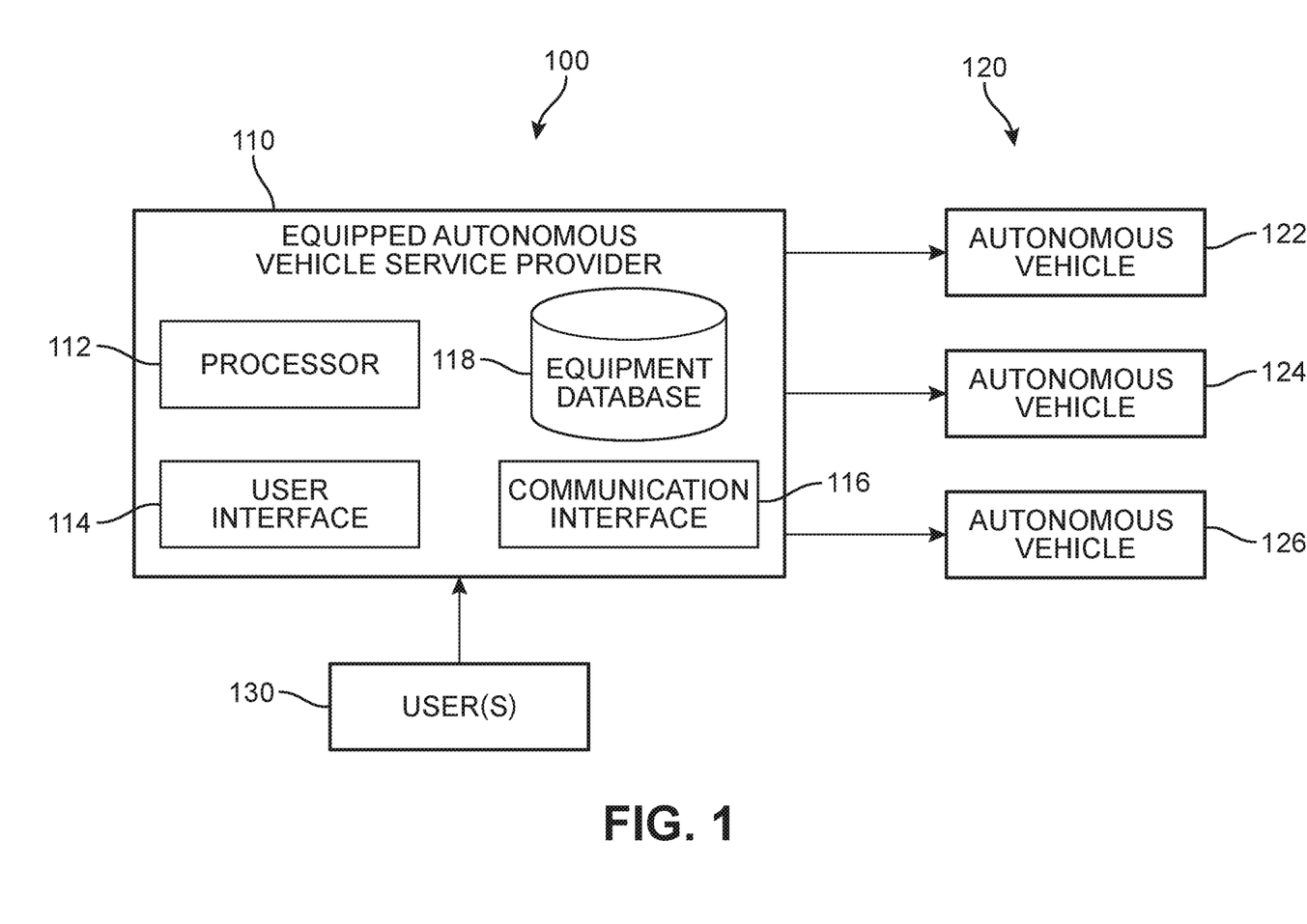
FIG. 1 is a schematic view of an example embodiment of a system for providing an equipped autonomous vehicle.

FIG. 1 illustrates a schematic diagram of an embodiment of a system 100 for providing an equipped autonomous vehicle. In an example embodiment, system 100 can include an equipped autonomous vehicle service provider 110 and a plurality of autonomous vehicles 120. Equipped autonomous vehicle service provider 110 can include hardware, software, and components that are configured to communicate with a plurality of autonomous vehicles 120 and one more users 130 requesting equipped autonomous vehicles.

In this embodiment, equipped autonomous vehicle service provider 110 can include a processor 112 that is in communication with at least a user interface 114, a communication interface 116, and an equipment database 118. In some embodiments, equipped autonomous vehicle service provider 110 can include other components not shown in FIG. 1 to facilitate receiving requests from users, determining equipment for selected activities, and instructing plurality of autonomous vehicles 120 to travel to particular destinations according to the example embodiments described herein.

In some embodiments, user interface 114 is configured to allow one or more users 130 to contact and communicate with equipped autonomous vehicle service provider 110. For example, in one embodiment, user interface 114 can interact with users 130 through an application (e.g., mobile app) or website. Communication interface 116 is configured to allow equipped autonomous vehicle service provider 110 to communicate with one or more autonomous vehicles of plurality of autonomous vehicles 120. For example, in one embodiment, communication interface 116 can be a wireless transceiver that transmits signals (e.g., commands, messages, information, etc.) to one or more autonomous vehicles of plurality of autonomous vehicles 120 and also receives signals from one or more autonomous vehicles of plurality of autonomous vehicles 120.

In this embodiment, plurality of autonomous vehicles 120 can include a first autonomous vehicle 122, a second autonomous vehicle 124, and a third autonomous vehicle 126. FIG. 1 illustrates three autonomous vehicles for the purpose of explanation, however, it should be understood that equipped autonomous vehicle service provider 110 can be configured to communicate with any number of autonomous vehicles. For example, in some embodiments, equipped autonomous vehicle service provider 110 can be configured to communicate with a fleet of autonomous vehicles, which can be located in different geographic locations. In this manner, equipped autonomous vehicle service provider 110 can be able to provide equipped autonomous vehicles to users (e.g., users 130) for destinations that are located across a large portion of a geographic area.

In some embodiments, equipment database 118 can include various sets of equipment that are associated with different activities. In an example embodiment, each activity can be matched or correlated with a specific set of equipment for that activity, Equipped autonomous vehicle service provider 110 can provide a list of each piece of equipment within a set of equipment to a user based on the user's selection of an activity to be performed or conducted at the user's destination. For example, based on a user's selected activity, a default set of equipment can be provided to the user that is specific to that activity and the user can choose from the various pieces of equipment in the set of equipment. In some embodiments, the user can also request particular items or pieces of equipment for an activity that can not be included in the set of equipment associated with that activity in equipment database 118.

In an example embodiment, the user's selected activity is an outdoor activity and the associated sets of equipment are related to the outdoor activity. For example, an outdoor activity can include one or more of camping, hiking, fishing, climbing, kayaking, snorkeling, skiing, hunting, tailgating, picnicking, or cycling. In other embodiments, other activities can also be selected by a user. For example, other activities can include parties, moving, holiday events, etc.

In some embodiments, equipment database 118 can include other information, including, but not limited to: information associated with a user (e.g., name, address, billing information, preferences, equipment or clothing sizes, other personal information, etc.), information associated with one or more autonomous vehicles of plurality of autonomous vehicles 120 (e.g., vehicle ID, capacity, location, status or availability, capabilities, etc.), routing or navigation information (e.g., for instructing equipped autonomous vehicles to travel to particular destinations, waypoints, or service centers, etc.), and/or other information that can be used by equipped autonomous vehicle service provider 110.

Figure 2:
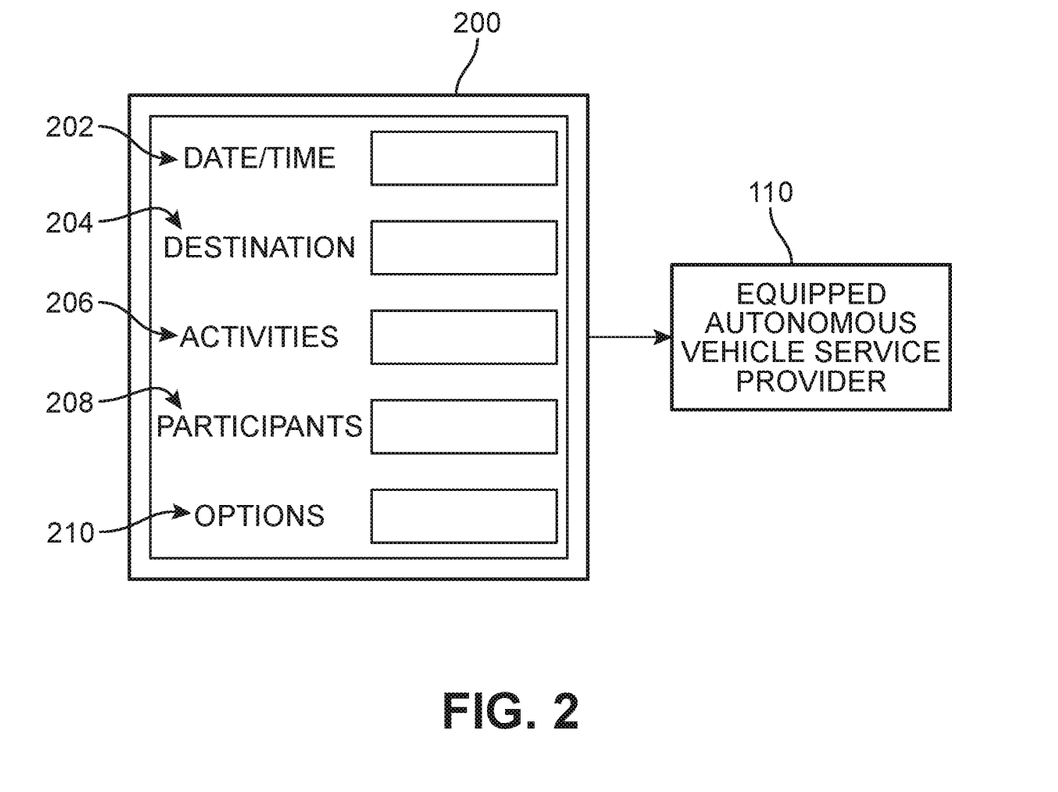
FIG. 2 is a schematic view of an example embodiment of a user interface for requesting an equipped autonomous vehicle.

Referring now to FIG. 2, an example embodiment of a user interface 200 for requesting an equipped autonomous vehicle is shown. As described above, in some embodiments, a user (e.g., one or more of users 130) can interact with user interface 114 at equipped autonomous vehicle service provider 110, which can be a mobile app or website. In an example embodiment, user interface 200 is provided on the user-side to allow the user to provide information to user interface 114 of equipped autonomous vehicle service provider 110. For example, user interface 200 can be provided through a user's mobile telephone, tablet, computer, or other device to allow the user to enter relevant information associated with a request for an equipped autonomous vehicle to a destination from equipped autonomous vehicle service provider 110.

In this embodiment, user interface 200 can include a number of fields to request information from the user about the request for the equipped autonomous vehicle. For example, as shown in FIG. 2, user interface 200 can include a data/time field 202 for information associated with the date(s) and time(s) that the user would like to request the equipped autonomous vehicle. User interface 200 can include a destination field 204 for information associated with a destination for the request and an activities field 206 for information associated with one or more activities for which the user would like to have equipment provided with the autonomous vehicle. Additionally, user interface 200 can include other fields, including, for example, a participants field 208 for information about a number of participants for the activities (e.g., the activities selected in activities field 206) and an options field 210 for other information that the user provides to equipped autonomous vehicle service provider 110 about the request, for example, additional equipment, clothing or equipment sizes, user preferences, etc.

Each field in user interface 200 can include a corresponding data entry area so that the user can enter the requested information. In some embodiments, the data entry area can be in the form of a drop down menu populated with predefined selections or can be a calendar, for example, in the case of date/time field 202, or other optional selection mechanism. Once the user has provided the information requested in fields 202, 204, 206, 208, and/or 210 via user interface 200, the request can be provided to equipped autonomous vehicle service provider 110. For example, as described above, equipped autonomous vehicle service provider 110 can receive the request sent by the user from user interface 200 via user interface 114.

Figure 3:
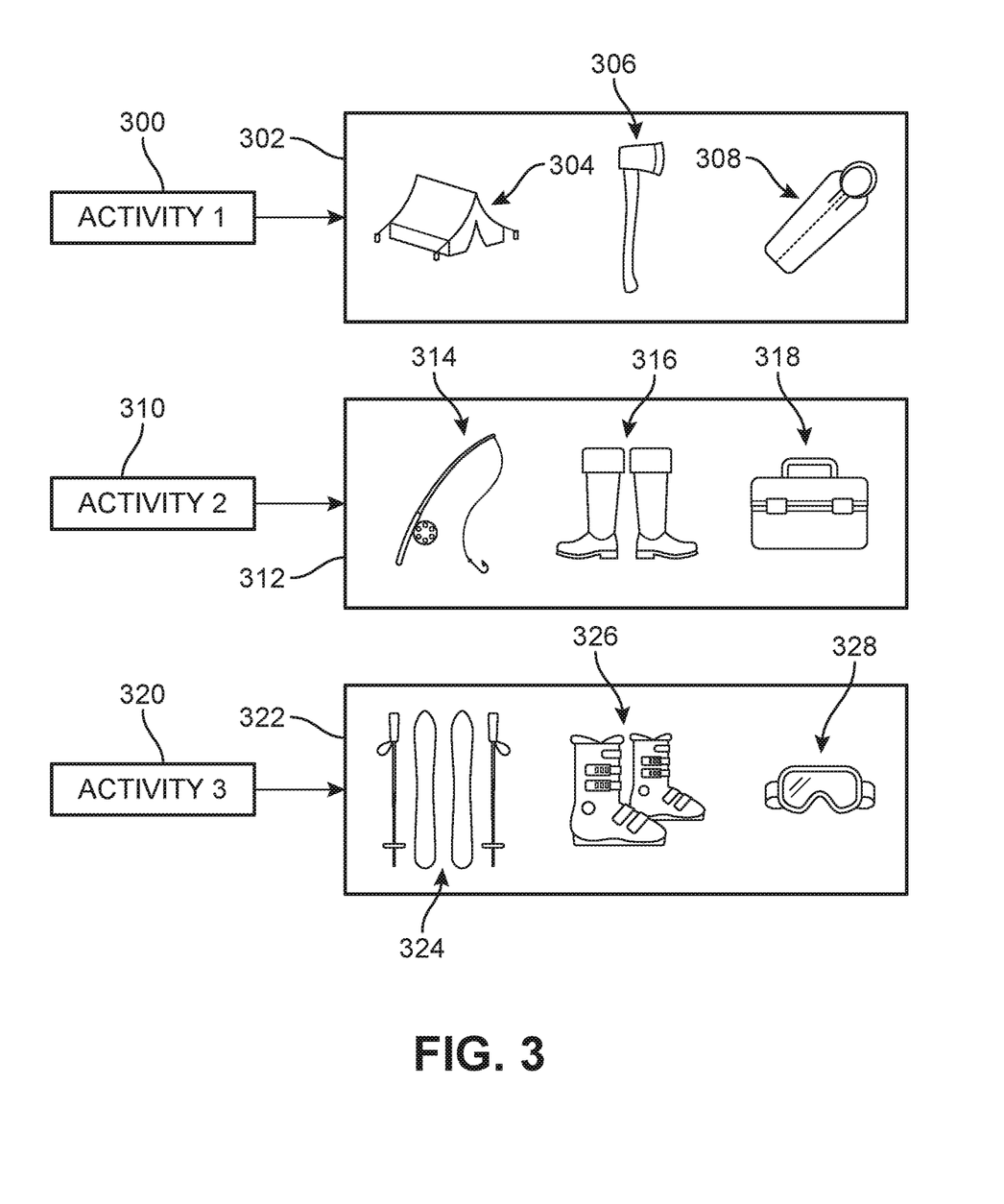
FIG. 3 is a representative view of example embodiments of sets of equipment associated with different activities.

Based on the request from the user, equipped autonomous vehicle service provider 110 determines at least one set of equipment for the activity or activities selected by the user in the request. Referring now to FIG. 3, example embodiments of sets of equipment associated with different activities are illustrated. In some embodiments, each activity can be associated with a default or predetermined set of equipment that is specific to that activity. Users can select particular equipment from the set of equipment and can modify, change, replace, remove, or add equipment based on the user's own preferences or needs.

For example, as shown in FIG. 3, a first activity 300 can be associated with a first set of equipment 302. In this embodiment, first activity 300 is camping and first set of equipment 302 can include a tent 304, an axe 306, and a sleeping bag 308. A second activity 310 can be associated with a second set of equipment 312 that is different than first set of equipment 302 and is specific to second activity 310. In this embodiment, second activity 310 is fishing and second set of equipment 312 can include a fishing pole 314, a pair of waders 316, and a tackle box 318. Similarly, a third activity 320 can be associated with a third set of equipment 322 that is different than first set of equipment 302 and second set of equipment 312 and is specific to third activity 320. In this embodiment, third activity 320 is snow skiing and third set of equipment 322 can include a pair of skis and poles 324, a pair of ski boots 326, and ski goggles 328.

In an example embodiment, each set of equipment 302, 312, 322 associated with each activity 300, 310, 320 can be stored in equipment database 118 at equipped autonomous vehicle service provider 110, as described above. It should be understood that the activities and associated sets of equipment shown in FIG. 3 are merely exemplary and additional or different activities and/or equipment can be provided to a user for a selected activity.

Additionally, a user can request sets of equipment for multiple activities and/or multiple participants. For example, in cases where a user's request indicates that multiple participants will be participating in first activity 300 (e.g., camping), equipped autonomous vehicle service provider 110 can include multiple pieces of equipment in the sets of equipment to reflect the number of participants, such as multiple sleeping bags 308 and/or a larger tent size for tent 304. Similarly, other modifications to the number and/or types of pieces of equipment for each set of equipment associated with a particular activity can be made based on the number of participants or other provided information accompanying the user's request to equipped autonomous vehicle service provider 110.

Figure 4:
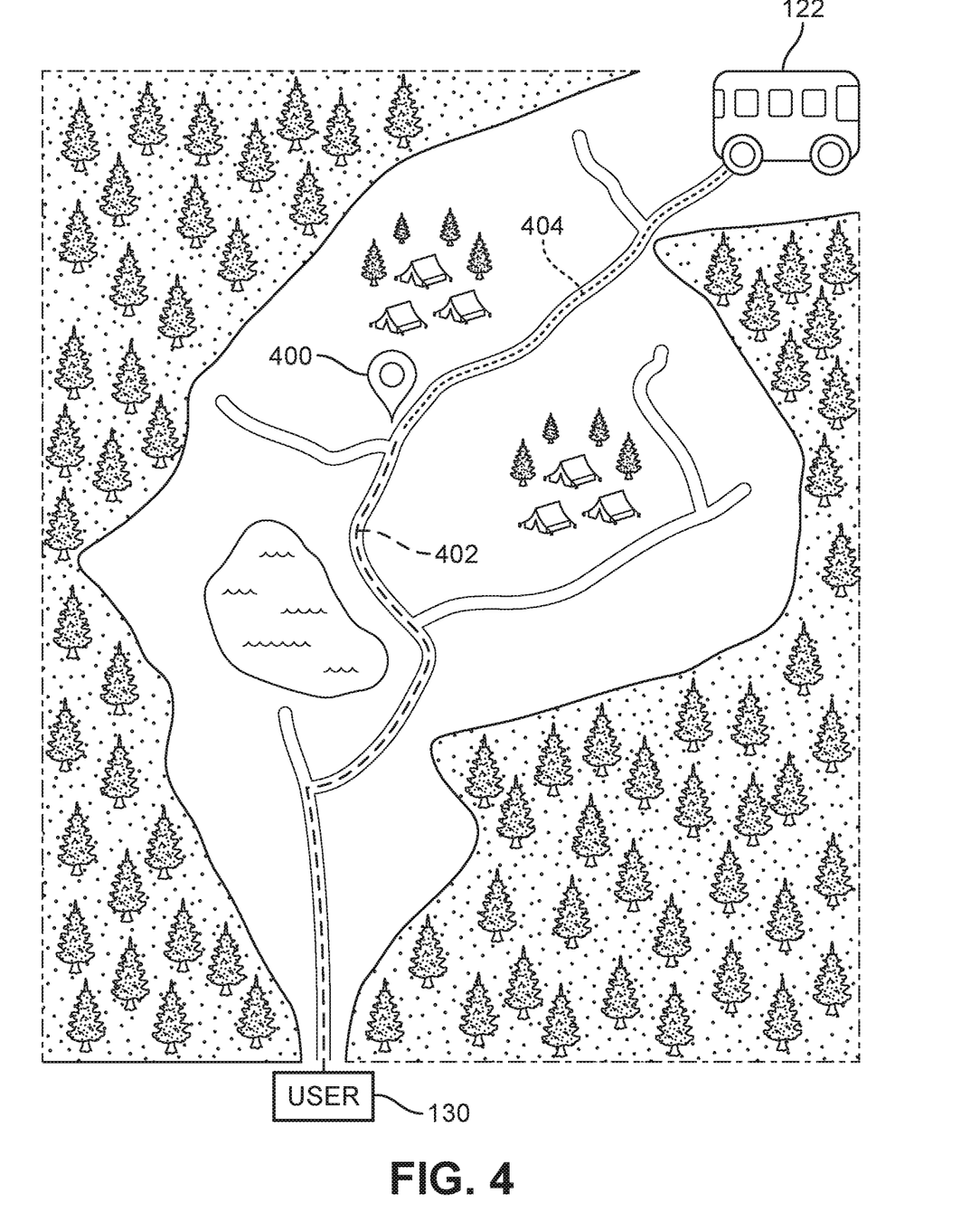
FIG. 4 is a representative view of an example embodiment of a method for providing an equipped autonomous vehicle to a destination.

Referring now to FIG. 4, an example embodiment of a method for providing an equipped autonomous vehicle to a destination is illustrated. As described above, in some embodiments, a user can request an equipped autonomous vehicle from a service provider (e.g., equipped autonomous vehicle service provider 110) that can include equipment for one or more activities at a destination selected by the user. In the embodiment shown in FIG. 4, user 130 has requested an equipped autonomous vehicle to meet user 130 at a destination 400. In response to the request from user 130, equipped autonomous vehicle service provider 110 has instructed first autonomous vehicle 122 to travel to destination 400.

In this embodiment, destination 400 is a campground. Accordingly, user 130 can include with the request information about one or more activities to be performed at destination 400. For example, user 130 can have indicated camping as a selected activity for destination 400. According to the techniques of the present embodiments described herein, first autonomous vehicle 122 is equipped with at least one set of equipment that is specific to the selected activity (e.g., camping). With this arrangement, user 130 can take a first route 402 to travel to destination 400, while first autonomous vehicle 122 takes a second route 404 to travel to destination 400.

As can be seen in FIG. 4, first route 402 to destination 400 taken by user 130 is different than second route 404 to destination 400 taken by first autonomous vehicle 122. Thus, user 130 does not need to rent and/or pull a trailer or camper to destination 400 to be able to enjoy the one or more activities to be performed at destination 400. Instead, user 130 can travel to destination 400 along any route and using any vehicle.

Figure 5:
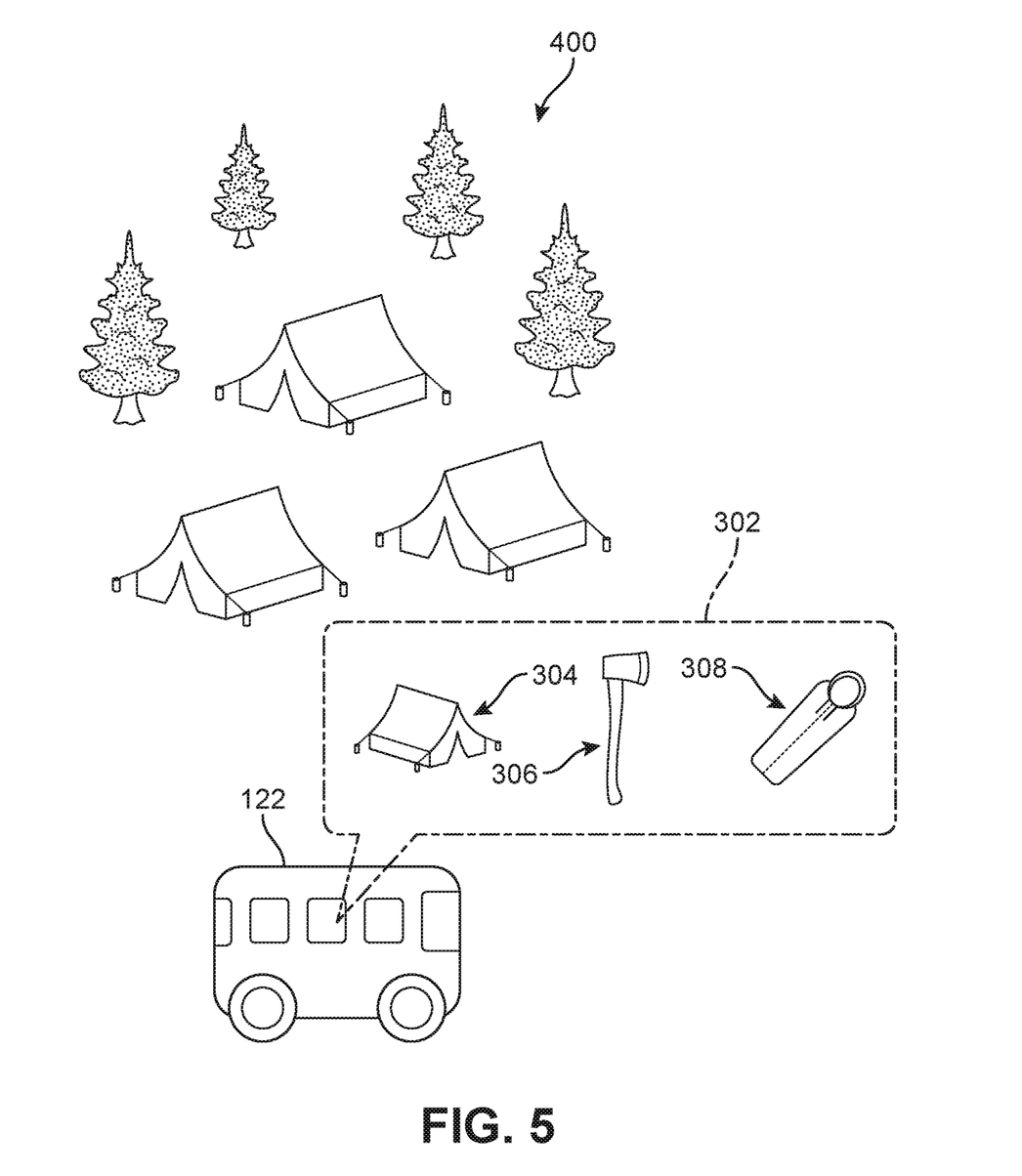
FIG. 5 is a schematic view of an example embodiment of an equipped autonomous vehicle with a set of equipment at a destination.

When user 130 arrives at destination 400, first autonomous vehicle 122, which is equipped with at least one set of equipment that is specific to the user-selected one or more activities to be performed at destination 400, is waiting and ready for user 130. Thus, user 130 does not need to bring equipment to destination 400 because it will be provided with equipped first autonomous vehicle 122. For example, as shown in FIG. 5, first autonomous vehicle 122 is equipped with first set of equipment 302 associated with first activity 300 (e.g., camping). When user 130 arrives at destination 400, user 130 can unpack first set of equipment 302 from first autonomous vehicle 122 to use for the selected activity. In this embodiment, user 130 has selected camping as an activity and first set of equipment 302 included with first autonomous vehicle 122 can include at least tent 304, axe 306, and sleeping bag 308.

It should be understood that the equipment included in first set of equipment 302 is merely exemplary. A user can select any number of pieces of equipment to be included with the equipped autonomous vehicle that is instructed to meet the user at the user's selected destination. Additionally, a user can select more than one activity with the request so that multiple sets of equipment are provided with the equipped autonomous vehicle. For example, in FIG. 5, first autonomous vehicle 122 is equipped with first set of equipment 302 associated with first activity 300 (e.g., camping). In some embodiments, user 130 can select other activities, such as second activity 310 (e.g., fishing), in which case first autonomous vehicle 122 is also equipped with second set of equipment 312 (including fishing pole 314, pair of waders 316, and tackle box 318) to use at destination 400.

In some embodiments, the equipped autonomous vehicle (e.g., first autonomous vehicle 122) can be provided with a security or authentication mechanism to unlock the equipped autonomous vehicle. For example, user 130 can use user interface 200, described above, to confirm the user's identity and/or location at destination 400 in order to unlock equipped first autonomous vehicle 122. The security mechanism can be any type of authentication mechanism, for example, a password, temporary code, two-factor authentication, token, NFC, biometric authentication, or other security feature so that the user and/or equipped autonomous vehicle service provider 110 can be sure that the equipment included in the equipped autonomous vehicle has not been tampered with and/or no unauthorized people have access to the equipped autonomous vehicle.

In addition, in some embodiments, the equipped autonomous vehicle can be configured for use by the user at the destination. For example, the equipped autonomous vehicle can be in the form of a camper, recreational vehicle (RV), or other vehicle capable of providing shelter or living/sleeping areas for a user.

Figure 6:
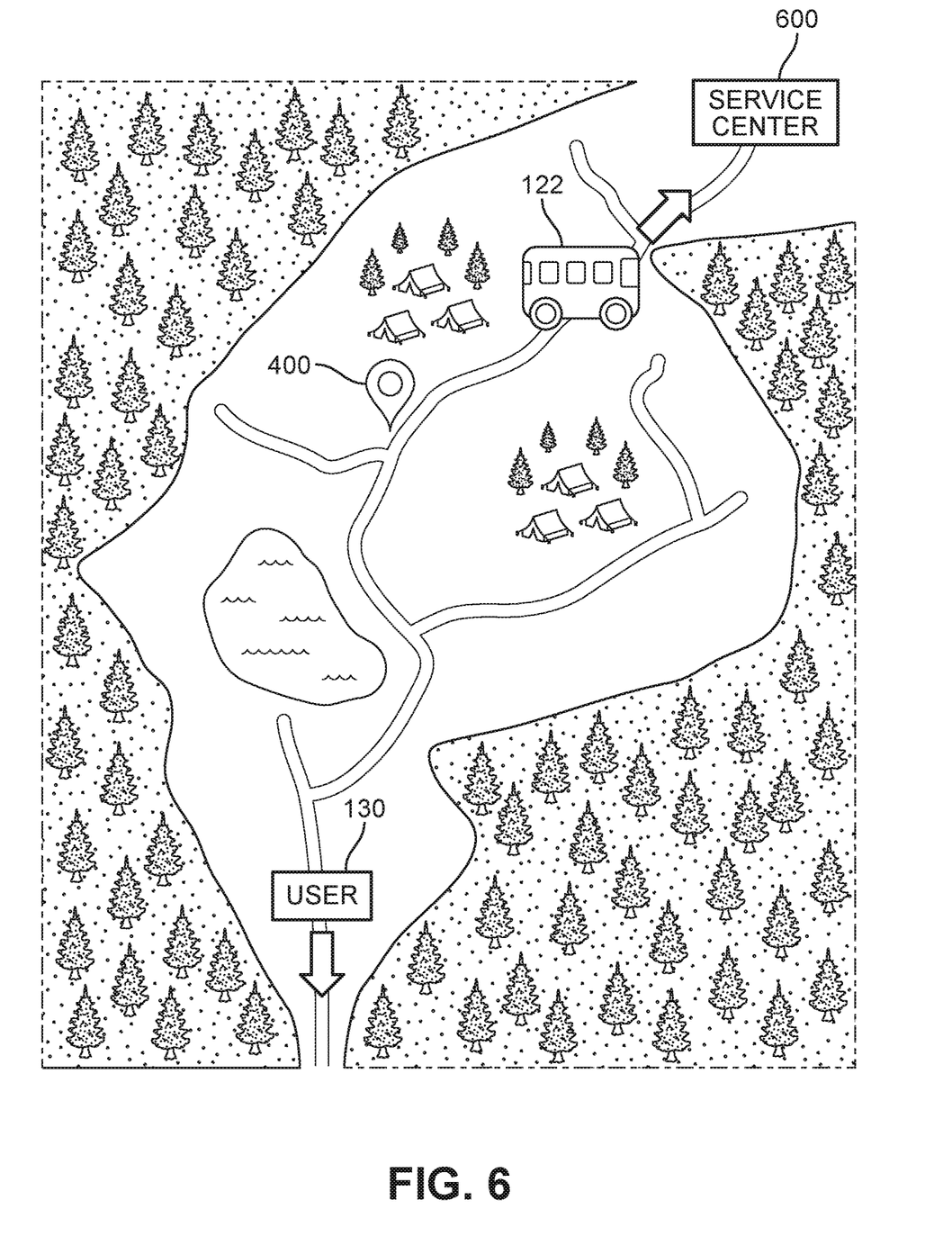
FIG. 6 is a representative view of an example embodiment of a method of returning an equipped autonomous vehicle from a destination.

In some embodiments, when a user is finished using the equipment provided with the equipped autonomous vehicle, the user only needs to place the equipment back into the equipped autonomous vehicle, which will then return to a designated service center or other destination for cleaning and re-equipping for other users. Referring now to FIG. 6, an example embodiment of a method of returning an equipped autonomous vehicle from a destination is shown.

In this embodiment, after user 130 has finished using first set of equipment 302 included with first autonomous vehicle 122, user 130 only needs to return each piece of equipment from first set of equipment 302 back into first autonomous vehicle 122. In some embodiments, user 130 can send a notification or confirmation to equipped autonomous vehicle service provider 110 that user 130 has finished, for example, through user interface 200. Upon receiving the notification from user 130, equipped autonomous vehicle service provider 110 can instruct first autonomous vehicle 122 to travel to a service center 600 from destination 400, In some embodiments, service center 600 is configured to remove the set of equipment (e.g., first set of equipment 302) from the equipped autonomous vehicle (e.g., first autonomous vehicle 122).

Once the equipment is removed, service center 600 can clean first autonomous vehicle 122 and/or the equipment, including performing any needed maintenance or repairs, and can store first set of equipment 302 for subsequent use. In some embodiments, service center 600 can also be configured to re-equip the autonomous vehicle (e.g., first autonomous vehicle 122) based on a request received from a new user.

In some embodiments, an equipped autonomous vehicle can be configured to stop at one or more intermediate destinations prior to reaching the destination selected by the user. For example, an autonomous vehicle can be equipped at the one or more intermediate destinations and/or various pieces of equipment can be located or stored at different locations.

Figure 7:
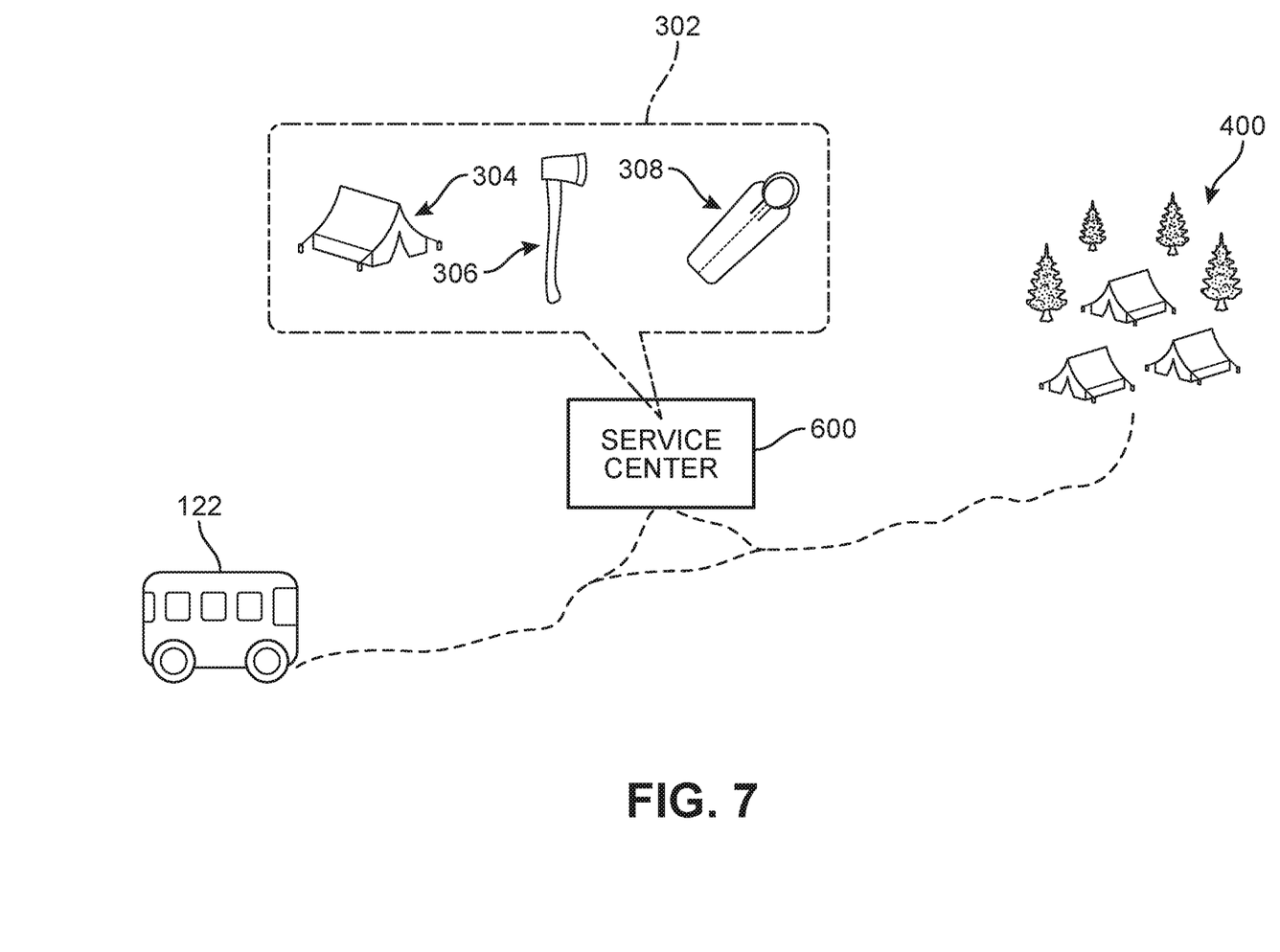
FIG. 7 is a representative view of an alternate embodiment of a method of providing an equipped autonomous vehicle to a destination.

Referring now to FIG. 7, an alternate embodiment of a method of providing an equipped autonomous vehicle to a destination is shown. In this embodiment, first autonomous vehicle 122 has been instructed to travel to destination 400 to provide first set of equipment 302 to user 130, as described above. In this example, first autonomous vehicle 122 first travels to an intermediate destination, service center 600, to obtain first set of equipment 302 before continuing to destination 400. With this arrangement, a plurality of service centers that store various different pieces of equipment can be geographically spread out across an area so that one or more autonomous vehicles of plurality of autonomous vehicles 120 can use the service centers to obtain the equipment associated with a request by a user. By instructing the autonomous vehicle to travel to the one or more intermediate destinations before arriving at the user's requested destination, the autonomous vehicle can be equipped with the specific set or sets of equipment for the activities selected by a user.

In some embodiments, additional suppliers or vendors can provide different types or kinds of equipment or supplies to the equipped autonomous vehicle. For example, first autonomous vehicle 122 can travel to at least one secondary service center or supplier to retrieve perishables, such as food, bait, water, or other consumer goods, that can be requested by the user for use at destination 400. In other embodiments, perishables can be provided at service center 600 or other location where the equipped autonomous vehicle retrieves the selected equipment.

Additionally, in other embodiments, the techniques of the present embodiments can be used to instruct an autonomous vehicle to pick up or obtain other items along its route to a destination. For example, an autonomous vehicle can be instructed to obtain items from a central warehouse or multiple warehouses. In addition, the equipped autonomous vehicle of the example embodiments can also be used to deliver and/or retrieve other items. For example, the techniques described herein can be used to autonomously deliver and/or retrieve seasonal items (e.g., holiday decorations), building supplies and tools, or other hauling tasks.

Figure 8:
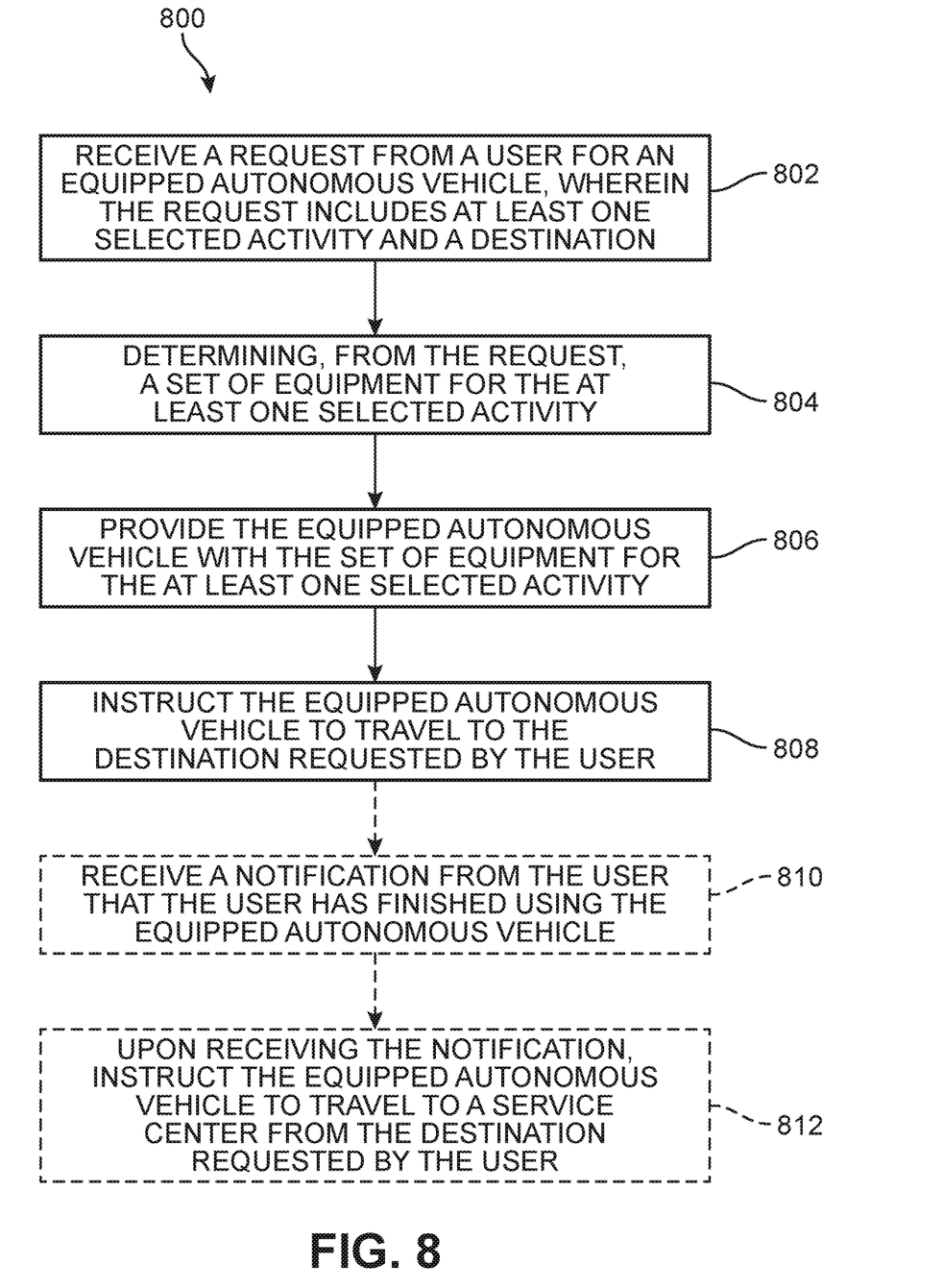
FIG. 8 is a flowchart of an example embodiment of a method for providing an equipped autonomous vehicle to a destination.

Referring now to FIG. 8, a flowchart of an example embodiment of a method 800 for providing an equipped autonomous vehicle to a destination is shown. In an example embodiment, method 800 can be implemented by equipped autonomous vehicle service provider 110, described above. As shown in FIG. 8, method 800 can being at an operation 802 where a request is received from a user for an equipped autonomous vehicle. The request can include at least one selected activity and a destination. For example, as shown in FIG. 4, user 130 has sent a request to equipped autonomous vehicle service provider 110 to have an equipped autonomous vehicle meet user 130 at a destination 400 and has chosen camping as at least one selected activity. It should be understood that the request can include additional information and/or criteria, for example, as described above in reference to user interface 200 shown in FIG. 2.

Next, method 800 can include an operation 804. At operation 804, based on the request in operation 802, a set of equipment for the at least one selected activity is determined. For example, as described in reference to the embodiment of FIG. 4, user 130 indicated camping as a selected activity for destination 400. At operation 804, therefore, first set of equipment 302 that is specific to the selected first activity 300 (e.g., camping) is determined. As described above, in an example embodiment, first set of equipment 302 associated with camping can include at least tent 304, axe 306, and sleeping bag 308.

Method 800 further can include an operation 806, where the equipped autonomous vehicle is provided with the set of equipment for the at least one selected activity. For example, in response to the request from user 130, first autonomous vehicle 122 is equipped with at least one set of equipment that is specific to the selected activity (e.g., camping).

Next, method 800 can include an operation 808. At operation 808, the equipped autonomous vehicle is instructed to travel to the destination requested by the user. For example, as shown in FIG. 4, equipped autonomous vehicle service provider 110 has instructed first autonomous vehicle 122 to travel to destination 400 to meet user 130. In some embodiments, the instruction from equipped autonomous vehicle service provider 110 to first autonomous vehicle 122 can include routing or navigation information for a particular route to destination 400. In other embodiments, first autonomous vehicle 122 can have self-contained routing or navigation capabilities or can communicate with a third party or other entity to receive routing or navigation information to arrive at destination 400.

Method 800 can end upon sending or providing the instruction to the equipped autonomous vehicle to travel to the destination. In other embodiments, method 800 can be implemented again for a new or additional request from the same or different users. In addition, in some embodiments, method 800 can include one or more additional or optional operations. For example, in some cases, method 800 can include an operation 810 where a notification is received from the user that the user has finished using the equipped autonomous vehicle. For example, as described above in reference to FIG. 6, once user 130 has finished using equipped first autonomous vehicle 122, user 130 can send a notification to equipped autonomous vehicle service provider 110 to inform equipped autonomous vehicle service provider 110 that user 130 has finished. In some embodiments, user 130 can send the notification via user interface 200, described above.

Method 800 can also include an operation 812. At operation 812, in response to receiving the notification from the user at operation 810, the equipped autonomous vehicle service provider can instruct the equipped autonomous vehicle to travel to a service center from the destination requested by the user. For example, as shown in FIG. 6, equipped autonomous vehicle service provider 110 can instruct first autonomous vehicle 122 to travel to service center 600 from destination 400 upon receiving a notification from user 130 that user 130 has finished using first autonomous vehicle 122.

In addition, in some cases, instructing the equipped autonomous vehicle to travel to the destination requested by the user (e.g., operation 808) can further include instructing the autonomous vehicle to travel to at least one intermediate destination prior to traveling to the destination. For example, as described in reference to FIG. 7 above.

In some embodiments, a service provider (e.g., equipped autonomous vehicle service provider 110) can be a third party contractor or other entity that cooperates with an owner/operator of a fleet of autonomous vehicles (e.g., plurality of autonomous vehicles 120). Additionally, one or more service centers (e.g., service center 600) that are configured to store, clean, maintain, and provide the pieces of equipment to equip the autonomous vehicles based on the user's request can be provided the same entity as the service provider or can be a third party contractor or other entity that cooperates with the service provider (e.g., equipped autonomous vehicle service provider 110). For example, one or more of the service centers can be outdoor equipment vendors or rental companies that are contracted to provide certain equipment.

The concepts of the present disclosure can be applied to other types of activities and destinations. For example the activities can be tasks, jobs or projects and the destinations can be job sites, with the equipment being tools and supplies for completion of the task, job or project.

While various embodiments have been described, the description is intended to be exemplary, rather than limiting and it will be apparent to those of ordinary skill in the art that many more embodiments and implementations are possible that are within the scope of the claims. Additionally, one or more of the various embodiments described above can be combined in part or in whole in accordance with the principles described herein. Accordingly, the embodiments are not to be restricted except in light of the attached claims and their equivalents. Also, various modifications and changes can be made within the scope of the attached claims.

What is claimed is:

1. A method for providing an equipped autonomous vehicle to a destination, the method comprising:
   receiving a request from a user for an equipped autonomous vehicle, wherein the request includes at least one selected activity and a destination;
   determining, from the request, a set of equipment for the at least one selected activity;
   providing the equipped autonomous vehicle with the set of equipment for the at least one selected activity;
   instructing the equipped autonomous vehicle to travel to the destination requested by the user;
   receiving a notification from the user that the user has finished using the equipped autonomous vehicle;
   upon receiving the notification from the user that the user has finished using the equipped autonomous vehicle, instructing the equipped autonomous vehicle to travel to a service center from the destination;
   wherein the service center is configured to remove and clean the set of equipment from the equipped autonomous vehicle.

2. The method of claim 1, wherein the at least one selected activity is an outdoor activity.

3. The method of claim 2, wherein the outdoor activity comprises one or more of camping, hiking, fishing, climbing, kayaking, snorkeling, skiing, hunting, tailgating, picnicking, or cycling.

4. The method of claim 1, wherein the set of equipment is specific to the at least one selected activity.

5. The method of claim 1, further comprising:
   determining, from the request, a number of participants for the at least one selected activity; and
   wherein providing the set of equipment for the at least one selected activity includes providing equipment for the number of participants included in the request.

6. The method of claim 1,
   wherein the request from the user includes at least two selected activities, including a first selected activity and a second selected activity different from the first selected activity;
   the method further comprising:
   providing the equipped autonomous vehicle with a first set of equipment for the first selected activity; and
   providing the equipped autonomous vehicle with a second set of equipment for the second selected activity.

7. The method of claim 1, wherein the service center is configured to store the set of equipment at the service center.

8. The method of claim 1, wherein the service center is configured to re-equip the autonomous vehicle with at least one set of equipment based on a request received from a new user.

9. The method of claim 1, wherein instructing the equipped autonomous vehicle to travel to the destination requested by the user includes:
   instructing the autonomous vehicle to travel to at least one intermediate destination prior to traveling to the destination.

10. The method of claim 9, wherein the set of equipment for the at least one selected activity is provided to the equipped autonomous vehicle at the at least one intermediate destination.

11. A system for providing an equipped autonomous vehicle to a destination, the system comprising:
    a service provider including a processor; and
    at least one autonomous vehicle;
    wherein the service provider is configured to:
    receive a request from a user for an equipped autonomous vehicle, wherein the request includes at least one selected activity and a destination;
    determine, from the request, a set of equipment for the at least one selected activity;
    provide the at least one autonomous vehicle with the set of equipment for the at least one selected activity;
    instruct the at least one autonomous vehicle that includes the set of equipment to travel to the destination requested by the user;
    receive a notification from the user that the user has finished using the at least one autonomous vehicle;
    upon receiving the notification from the user that the user has finished using the at least one autonomous vehicle, instruct the at least one autonomous vehicle to travel to a service center from the destination;
    wherein the service center is configured to remove and clean the set of equipment from the at least one autonomous vehicle.

12. The system of claim 11, wherein the at least one selected activity is an outdoor activity.

13. The system of claim 12, wherein the outdoor activity comprises one or more of camping, hiking, fishing, climbing, kayaking, snorkeling, skiing, hunting, tailgating, picnicking, or cycling.

14. The system of claim 11, wherein the set of equipment is specific to the at least one selected activity.

15. The system of claim 11, wherein the service provider is further configured to:
    determine, from the request, a number of participants for the at least one selected activity; and
    wherein providing the set of equipment for the at least one selected activity includes providing equipment for the number of participants included in the request.

16. The system of claim 11, wherein the request from the user includes at least two selected activities, including a first selected activity and a second selected activity different from the first selected activity;
    wherein the service provider is further configured to:
    provide the at least one autonomous vehicle with a first set of equipment for the first selected activity; and provide the at least one autonomous vehicle with a second set of equipment for the second selected activity.

17. The system of claim 11, wherein the service center is configured to store the set of equipment at the service center.

18. The system of claim 11, wherein the service center is configured to re-equip the at least one autonomous vehicle with at least one set of equipment based on a request received at the service provider from a new user.

19. The system of claim 11, wherein instructing the at least one autonomous vehicle to travel to the destination requested by the user includes:
   instructing the autonomous vehicle to travel to at least one intermediate destination prior to traveling to the destination.

20. The system of claim 19, wherein the set of equipment for the at least one selected activity is provided to the at least one autonomous vehicle at the at least one intermediate destination.

\* \* \* \* \*